(12) United States Patent
Scribano et al.

(10) Patent No.: US 7,417,968 B2
(45) Date of Patent: Aug. 26, 2008

(54) METHOD AND APPARATUS FOR IMPROVING HARD HANDOFFS IN CDMA SYSTEMS

(75) Inventors: Gino A. Scribano, St. Charles, IL (US); Kent M. Conness, Downers Grove, IL (US); Krsman Martinovich, Streamwood, IL (US)

(73) Assignee: Motorola, Inc., Schaumburg, IL (US)

( * ) Notice: Subject to any disclaimer, the term of this patent is extended or adjusted under 35 U.S.C. 154(b) by 753 days.

(21) Appl. No.: 10/726,233

(22) Filed: Dec. 2, 2003

(65) Prior Publication Data

US 2004/0109425 A1 Jun. 10, 2004

Related U.S. Application Data

(60) Provisional application No. 60/431,296, filed on Dec. 6, 2002.

(51) Int. Cl.
*H04Q 7/00* (2006.01)
(52) U.S. Cl. .......................... 370/331; 455/436; 455/438
(58) Field of Classification Search .......... 370/331.332, 370/335, 342; 455/436, 437, 438, 439, 346
See application file for complete search history.

(56) References Cited

U.S. PATENT DOCUMENTS

| | | | |
|---|---|---|---|
| 6,026,301 A * | 2/2000 | Satarasinghe | 455/436 |
| 6,590,879 B1 | 7/2003 | Huang et al. | |
| 6,708,030 B1 * | 3/2004 | Horikawa | 455/436 |
| 7,130,285 B2 * | 10/2006 | Chang | 455/436 |
| 2001/0030953 A1 | 10/2001 | Chang | |
| 2003/0193911 A1 * | 10/2003 | Zhao et al. | 370/331 |
| 2003/0211848 A1 * | 11/2003 | Rajkotia et al. | 455/436 |
| 2005/0159158 A1 | 7/2005 | Pardeep et al. | |

* cited by examiner

*Primary Examiner*—Quochien B Vuong

(57) ABSTRACT

A method of improving hard handoffs in a communication system comprising a source base station (BS) 114, a target BS 106 and a mobile switching center (MSC) 104. In particular, when a handoff is needed, a requested service option and a list of service options supported by a mobile station (MS) 202 are communicated from the source BS to the target BS. Upon receiving a handoff request message, the target base station selects either the requested service option or an alternate service option. The alternate service option is chosen based on one or more of the MS's service option capabilities, service option priorities, and resources available in the target BS. The selected service option is communicated to the source BS and the MS.

9 Claims, 2 Drawing Sheets

METHOD AND APPARATUS FOR IMPROVING HARD HANDOFFS IN CDMA SYSTEMS

REFERENCE(S) TO RELATED APPLICATION(S)

The present application claims priority from provisional application, Serial No. 60/431,296, entitled "METHOD AND APPARATUS FOR IMPROVING HARD HANDOFFS IN CDMA SYSTEMS," filed Dec. 6, 2002, which is commonly owned and incorporated herein by reference in its entirety.

FIELD OF THE INVENTION

The present invention relates generally to the field of communication systems, and more particularly, to a method and apparatus for improving hard handoff in a CDMA system.

BACKGROUND OF THE INVENTION

Currently, a source base station does not convey mobile station service option capabilities to a target base station during the handoff process. Rather than having the source base station convey this information, current standards require the source base station to be provisioned with the target base station service option capabilities. With this provisioned capability information, the source base station proposes a service option to the target base station to be configured in the mobile station during the handoff process. However, the target base station may not be able to support the source-proposed service option due to resource constraints or other transient prohibiting factors. As such, the standard allows the target base station to select an alternate service option to be configured in the mobile during the handoff process. This can be problematic. Because the mobile station's service option capabilities are not conveyed to the target base station, the target base station cannot reliably or optimally select an alternate service option to be configured in the mobile station during the handoff.

Thus, there is a need for a method of improving hard handoffs in CDMA systems.

DETAILED DESCRIPTION OF THE DRAWINGS

The present invention provides a method and apparatus for improving hard handoffs in CDMA systems by conveying service option information between a source base station and a target base station during hard handoff. Three improvements can be realized if authorized mobile station service option capabilities and service option preference is conveyed to the target base station: 1) the requirement for network operators to provision each source base station with the service option capabilities of each target base station is eliminated; 2) the target base station is able to reliably and optimally choose an alternate service option based on authorized mobile service option capabilities and the availability of service option resources in the target base station; and 3) the target base station is able to optimally choose an alternate service option based on a mobile station's preferred service option.

In a first embodiment of the invention, a source base station (BS) sends a request for handoff to a mobile switching center (MSC). The request includes a requested service option and a list of service options supported by a mobile station (MS). Later, the source BS receives a handoff command including a service option selected by a target BS. In the first embodiment, the selected service option is either the service option requested by the source BS or a service option contained in the list of service options supported by the MS. The source BS, in turn, sends a handoff direction message containing the selected service option to the MS.

In a second embodiment of the present invention, a target BS receives a request for handoff. The request includes a requested service option and a list of service options supported by a MS. Upon receiving the request, the target BS determines whether the requested service option is supported. When the requested service option is not supported, the target BS selects an alternate service option from the list of service options. When the requested service option is supported, the target BS selects the requested service option. Next, the target BS sends a handoff request acknowledge containing the selected service option to a MSC.

In a third embodiment of the invention, the MSC receives a request for handoff from the source BS, wherein the request includes a requested service option and a list of service options supported by the mobile station. The MSC sends a handoff request message to the target base station. The handoff request message includes the requested service option and the list of service options supported by the mobile station. Prior to sending the handoff request message to the target base station, the MSC may remove one or more unauthorized service options from the list of service options supported by the mobile station. In that case, the list of service options supported by the mobile station will include mobile supported and authorized service options.

Figure 1:
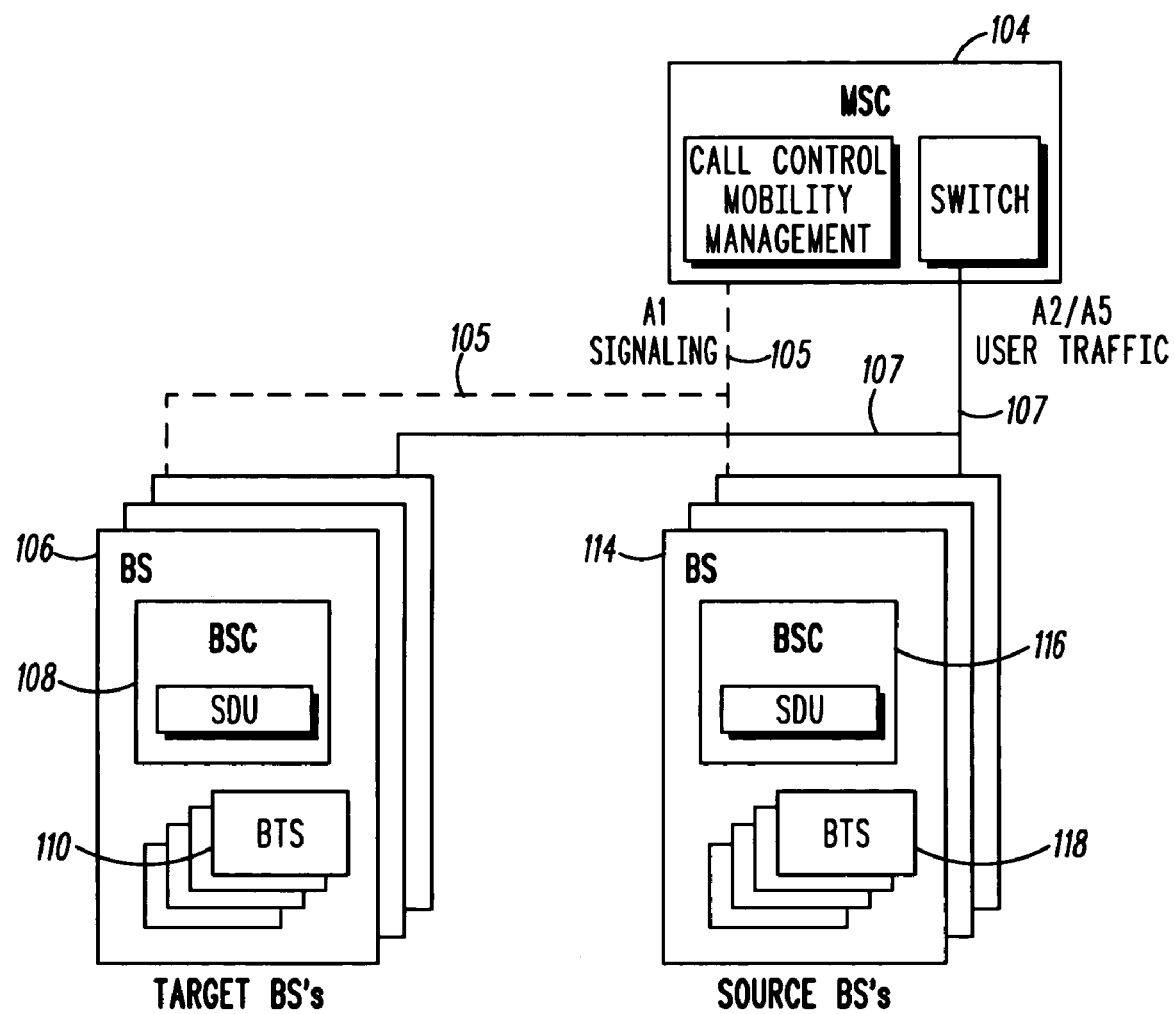
FIG. 1 is a system block diagram in support of the method of improving hard handoffs of the present invention.

Referring now to FIG. 1, a logical block diagram of a system in support of the present invention is shown. In particular, FIG. 1 is an abbreviated reference model for CDMA2000 Radio Access Networks and illustrates the relationship among network components in support of the method of the present invention. The function and operation of the components shown in FIG. 1 are commonly known by one of ordinary skill in the art and will not be discussed in detail herein. FIG. 1 depicts target and source base stations (BSs) 106, 114 in communication with mobile switching center (MSC) 104 over A1, A2 and A5 interfaces. The A1 interface 105 is used to provide a signaling connection between the BS 106, 114 and the MSC 104. The A2 interface is used to provide a path for user traffic for circuit-oriented voice and Integrated Service Digital Network (ISDN) calls between the BS 106, 114 and the MSC 104. The A5 interface is used to provide a path for user traffic for circuit-oriented data calls between the BS 106, 114 and the MSC 104. The MSC 104 may in fact be two MSCs if a handoff is occurring inter-MSC. In such a case, the two MSCs could communicate with each other over an ANSI-41 interface (not shown) which is used to provide a signaling connection and path for user traffic between MSCs serving a source. BS 114 and a target BS 106. User traffic could be communicated between two MSCs over a User Traffic Interface (not shown).

Both the target BS 106 and source BS 114 include a base station controller (BSC) 108, 116, respectively, and one or more base transceiver stations (BTS) 110, 118, respectively. The BTSs 110, 118 include wireless transceivers for wirelessly communicating with wireless devices (not shown). The wireless devices and BTSs 110, 118 provide for coding, decoding, error checking and correction, frame type determination, power control, wireless transmission and reception and other similar functions as is otherwise generally understood in the art. The BTS 110, 118 typically couples with one or more BSCs 108, 116 that can include selector distributor units (SDUs). The MSC 104 includes call control mobility management and switch functionality as is generally understood in the art. In an embodiment of the present invention, the method of the present invention runs in the BS 106, 114 and MSC 104 on any commercially available processor or computer.

Figure 2:
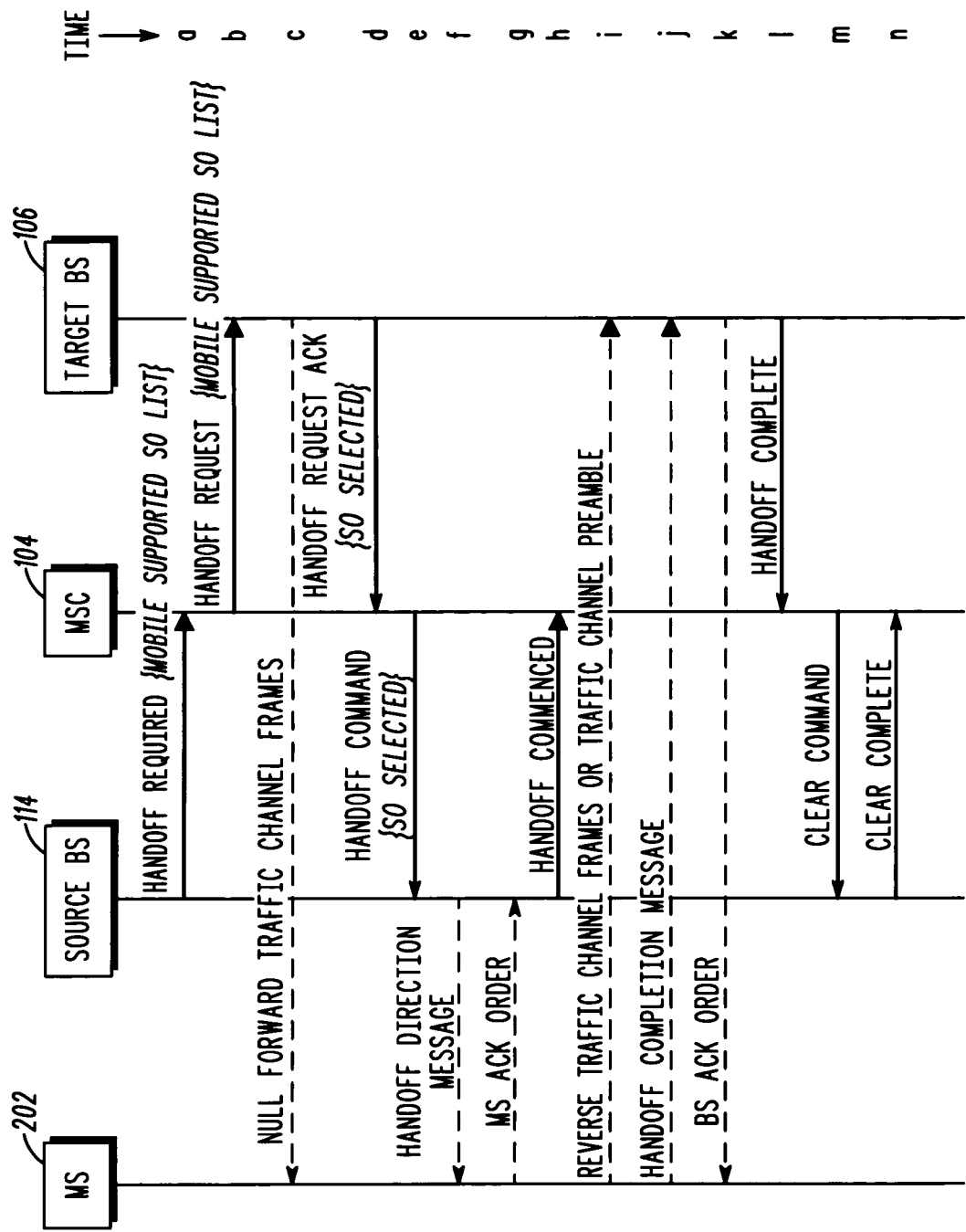
FIG. 2 is a flow diagram of an embodiment of the method of improving hard handoffs of the present invention.

FIG. 2 is a flow diagram of an embodiment of the invention wherein the target BS 106 changes the service option during a hard handoff in response to the source BS 114 conveying the service options supported by the MS 202. At step a, based on an MS report that it crossed a network specified threshold for signal strength or for other reasons, the source BS 114 recommends a hard handoff to one or more cells in the domain of the target BS 106. The source BS 114 sends a handoff required message with the list of cells and a requested service option to the MSC 104. The message also contains a list of service options supported by the MS 202. This service option list may be prioritized according to the MS's preference.

At step b, the MSC 104 sends a handoff request message to the target BS 106. This message carries the list of MS supported service options. Any service option priority information is preserved. In addition, the MSC 104 may remove unauthorized service options from this list. In such a case, the target BS 106 receives mobile-supported and mobile-authorized service options. Upon receipt of the handoff request message from the MSC 104, the target BS 106 selects a service option to be used during the handoff. If the target BS 106 determines that the requested service option is not supported, it selects an alternate service option based on the MS's service option capabilities, service option priorities, and the resources available in the target BS 106. The target BS 106 then allocates appropriate radio resources and initiates connection of the call. The target BS 106 sends null forward traffic channel frames to the MS 202 (step c).

At step d, the target BS 106 sends a handoff request acknowledge message to the MSC 104. The target BS 106 includes the new service option it selected in the service configuration record information element contained in the handoff acknowledge message. At step e, upon receipt of the handoff request acknowledge message, the MSC 104 prepares to switch from the source BS 114 to the target BS 106 and sends a handoff command to the source BS 114. The MSC 104 includes the service option it received from the handoff request acknowledgement message in the handoff command message.

At step f, the source BS 114 sends a handoff direction message containing the new service option (General Handoff Direction Message or Universal Handoff Direction Message) to the MS 202. At step g, the MS 202 may acknowledge the handoff direction message by sending an MS ack order to the source BS 114. At step h, the source BS sends a handoff commenced message to the MSC 104 to notify it that the MS 202 has been ordered to move to the target BS channel. At step i, the MS 202 sends reverse traffic channel frames or the traffic channel preamble to the target BS 106.

At step j, the MS 202 sends a handoff completion message to the target BS 106. At step k, the target BS 106 sends the BS ack order to the MS 202 over the air interface. At step l, the target BS 106 sends a handoff complete message to the MSC 104 to notify it that the MS 202 has successfully completed the hard handoff. At step m, the MSC 104 sends a clear command to the source BS 114. At step n, the source BS 114 sends a clear complete message to the MSC 104 to notify it that clearing has been accomplished.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modification, equivalents and alternatives falling within the invention as defined by the following appended claims.

What is claimed is:

1. In a communication system comprising a source base station, a target base station and a mobile switching center, a method of improving hard handoff comprising:

by the source base station, sending a request for handoff to the mobile switching center, wherein the request comprises a requested service option and a list of service options supported by a mobile station;

receiving by the source base station, a handoff command comprising a service option selected by the target base station, wherein the selected service option comprises one of the requested service option and a service option in the list of service options supported by the mobile station; and sending, by the source base station, a handoff direction message containing the selected service option to the MS.

2. The method of claim 1 wherein the request for handoff recommends a hard handoff to one or more cells in a domain of the target base station.

3. The method of claim 1 wherein the list of service options is prioritized according to a preference of the mobile station.

4. In a communication system comprising a source base station, a target base station and a mobile switching center, a method of improving hard handoff comprising:

by the target base station, receiving a request for handoff wherein the request comprises a requested service option and a list of service options supported by a mobile station;

determining whether the requested service option is supported;

when the requested service option is not supported, selecting an alternate service option;

when the requested service option is supported, selecting the requested service option; and sending, by the target base station, a handoff request acknowledge comprising the selected service option.

5. The method of claim 4 wherein the step of selecting an alternate service option comprises selecting the alternate service option based on one or more of a MS's service option capabilities, service option priorities, and resources available in the target base station.

6. The method of claim 4 further comprising sending a handoff request acknowledge message to the mobile switching center, wherein the message comprises the selected service option.

7. In a communication system comprising a source base station, a target base station and a mobile switching center, a method of improving hard handoff comprising:

receiving, by the mobile switching center, a request for handoff from the source base station, wherein the request comprises a requested service option and a list of service options supported by a mobile station; and sending, by the mobile switching center, a handoff request message to the target base station, wherein the request message comprises the requested service option and the list of service options supported by the mobile station.

8. The method of claim 7 wherein the step of sending comprises:
- removing one or more unauthorized service options from the list of service options supported by the mobile station to produce a list of mobile supported and authorized service options; and
- sending a handoff request message to the target base station, wherein the message comprises the requested service option and the list of mobile supported and authorized service options.

9. The method of claim 7 further comprising:
- receiving a handoff request acknowledge message comprising a service option selected by the target base station;
- preparing to switch from the source base station to the target base station; and
- sending a handoff command to the source base station, wherein the command comprises the service option selected by the target base station.

* * * * *